(12) United States Patent
Lee (10) Patent No.: US 9,292,669 B2
(45) Date of Patent: Mar. 22, 2016

(54) METHOD AND APPARATUS FOR INPUTTING PASSWORD IN ELECTRONIC DEVICE

(75) Inventor: Sang-Cheol Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 713 days.

(21) Appl. No.: 13/350,348

(22) Filed: Jan. 13, 2012

(65) Prior Publication Data

US 2012/0185934 A1    Jul. 19, 2012

(30) Foreign Application Priority Data

Jan. 14, 2011    (KR) .......................... 10-2011-0003887

(51) Int. Cl.
*H04L 29/06*        (2006.01)
*G06F 21/31*        (2013.01)
*G06F 21/62*        (2013.01)

(52) U.S. Cl.
CPC .............. *G06F 21/31* (2013.01); *G06F 21/629* (2013.01)

(58) Field of Classification Search
None
See application file for complete search history.

(56) References Cited

U.S. PATENT DOCUMENTS

2007/0174904 A1*    7/2007    Park .................................. 726/7
2010/0017860 A1*    1/2010    Ishida ............................... 726/7

* cited by examiner

*Primary Examiner* — Joseph P Hirl
*Assistant Examiner* — Leynna Truvan (57) ABSTRACT

A method inputs a password in an electronic apparatus. In the method, whether an authentication number input request corresponding to a password exists is determined. When the authentication number input request exists, a screen for requiring input of an authentication query number and a corresponding authentication number is displayed. Whether the input authentication number and the input authentication query number match with each other is determined. When they match with each other, relevant approval screen or a relevant function is entered. Since a specific authentication number with respect to a specific authentication query number among a plurality of authentication query numbers is used with a general number or character in a combined manner, a password may be kept safe even when exposed and so use convenience is provided.

16 Claims, 5 Drawing Sheets

METHOD AND APPARATUS FOR INPUTTING PASSWORD IN ELECTRONIC DEVICE

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jan. 14, 2011 and assigned Serial No. 10-2011-0003887, the entire disclosure of which is hereby incorporated by reference.

TECHNICAL FIELD OF THE INVENTION

The present invention relates to a method and an apparatus for inputting a password in an electronic device. More particularly, the present invention relates to a method and an apparatus for inputting a password in an electronic device realized to prevent personal information from being exposed in advance by providing a safe password input method to a user.

BACKGROUND OF THE INVENTION

Generally, most of apparatuses and devices including various devices requiring security such as an Automatic Teller Machine (ATM) of a bank, a safe open/close device, a computer, and a mobile communication terminal that need to set and release a password, input a separately provided button key or a password via a password input screen prepared in a separately provided display unit.

More particularly, a mobile communication terminal requires a password when a user initially enters the mobile terminal, but as electronic communication industries develop, the user is requested to input password even when the user desires to use relevant contents, enter a desired Internet site, or download a relevant file.

In more detail, a mobile communication terminal has various additional functions besides a basic communication function. For example, the mobile communication terminal mounts a phonebook function, an electronic scheduler, an Internet access, games, music reproduction, etc. thereon. For the phonebook function or electronic scheduler, the mobile communication terminal is configured to set a password so that information thereof cannot be read. In addition, in case of user information or voice reproduction, password setting is required. In this example, exposure of a password causes a very important problem such as infringement of personal privacy.

As a specific example, when a mobile communication terminal requires input of a password, a controller of the mobile terminal actually displays a visual keyboard when the mobile communication terminal has a touch screen, and requires a user to input a password using the visual keyboard. In this example, the user sequentially inputs relevant numbers or combination of numbers and characters of four digits or more while viewing the keyboard. A frequent password input in a public place where other people may view by the side has a problem of exposing personal information. Accordingly, inconvenience of having to frequently change a password is caused.

SUMMARY OF THE INVENTION

To address the above-discussed deficiencies of the prior art, it is a primary object to provide at least the advantages described below. Accordingly, an aspect of the present disclosure is to provide a method and an apparatus for inputting a password in an electronic device, realized such that a user does not need to directly input a password and so a worry that the password is exposed to other people is excluded.

Another aspect of the present disclosure is to provide a method and an apparatus for inputting a password in an electronic device, realized not to expose a password to other people by combined use of an authentication password known to a user and a general number.

Still another aspect of the present disclosure is to provide a safer method and a safer apparatus for inputting a password in an electronic device by inputting only a simple authentication number with respect to an authentication query number.

In accordance with an aspect of the present disclosure, an electronic apparatus is provided. The apparatus includes a display unit for displaying an authentication query number and authentication number input require screen according to a password input request, a key input unit for receiving an authentication number, a memory unit for storing matched authentication query number and authentication number for the password, and a controller for controlling to display the authentication query number according to an authentication number input request, and matching the input authentication number with the authentication query number to determine whether to authenticate.

In addition, an exemplary embodiment of the present disclosure provides a method for storing a password using the above-described apparatus.

In accordance with another aspect of the present disclosure, a method for storing a password in an electronic apparatus is provided. The method includes determining whether an authentication number store request with respect to a relevant password exists, when the authentication number store request exists, determining input of an authentication query number and a corresponding authentication number, and when the input of the authentication query number and the authentication number is completed, matching the authentication query number with the authentication number for the relevant password to store the same.

Also, an exemplary embodiment of the present disclosure provides a method for inputting a password using the above-described apparatus.

In accordance with still another aspect of the present disclosure, a method for inputting a password in an electronic apparatus is provided. The method includes determining whether an authentication number input request corresponding to a password exists, when the authentication number input request exists, displaying a screen for requiring input of an authentication query number and a corresponding authentication number, determining whether the input authentication number and the input authentication query number match with each other, and when they match with each other, entering a relevant approval screen or a relevant function.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged authentication system. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Though exemplary embodiments of the present disclosure illustrate the construction of a mobile communication terminal and describe a method for inputting a password, they are not limited thereto. For example, exemplary embodiments of the present disclosure are applicable to various electronic apparatuses needing user authentication.

Figure 1:
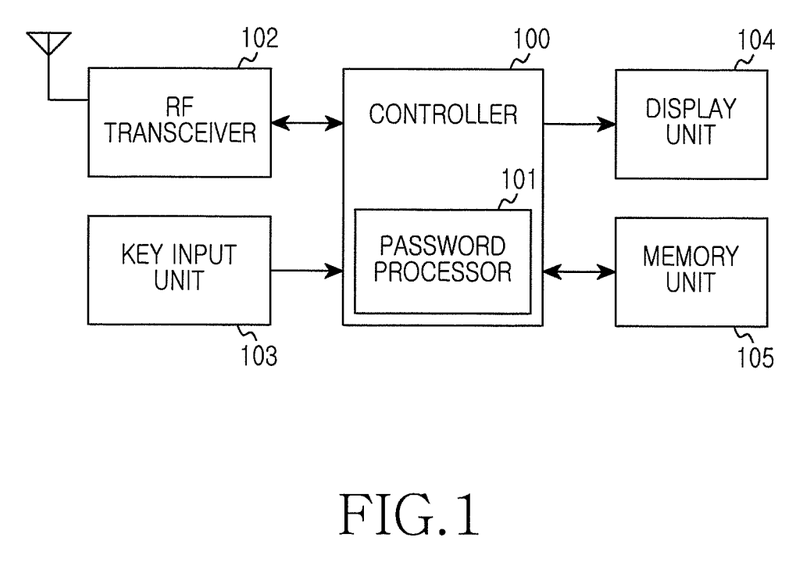
FIG. 1 illustrates a mobile communication terminal according to an exemplary embodiment of the present disclosure.

FIG. 1 illustrates a mobile communication terminal according to an exemplary embodiment of the present disclosure. The mobile communication terminal includes a controller 100, a Radio Frequency (RF) transceiver 102, a key input unit 103, a display unit 104, a memory unit 105, and a password processor 101.

The controller 100 controls an overall operation of the mobile communication terminal, and simultaneously, according to an exemplary embodiment of the present disclosure, provides a screen for storing a password to a user, and provides a screen for storing an authentication query number corresponding to a relevant password, and an authentication number corresponding to the authentication query number. In addition, the controller matches the relevant password, the authentication query number, and the authentication number with one another, and stores them in the memory unit according to a store request of the password, the authentication query number, and the authentication number. In addition, the controller determines whether to approve the password of the mobile terminal depending on a matching result of an authentication query number and an authentication number received from the password processor, and allows a user to enter a relevant approval screen.

The key input unit 103 not only performs various data inputs but also receives a password, an authentication query number, and an authentication number to be stored in the memory unit 105 from the user to provide the same to the controller, and provides the received authentication number to the controller according to an exemplary embodiment of the present disclosure.

The display unit 104 displays various data, etc., and according to an exemplary embodiment of the present disclosure, displays a screen for requiring input of a password, an authentication query number, and an authentication number to be stored. Also, the display unit 104 may display a screen for requiring an authentication number to the user according to a request of the controller.

The memory unit 105 not only stores various data of the mobile terminal but also matches a password number, an authentication query number, and an authentication number with one another requested by the controller and stores them according to an exemplary embodiment of the present disclosure.

The password processor 101 generates an authentication query number at random according to the user's authentication number input request and requests the authentication query number to be displayed on the display unit, and matches an authentication number input via the key input unit with the authentication query number according to the requested screen for requiring the authentication number to provide the matching result to the controller.

During reception, the RF transceiver 102 down-converts an RF signal received via an antenna, and despreads and channel-decodes the received signal. During transmission, the RF transceiver 102 channel-codes and spreads transmission data, and up-converts a signal to transmit the signal via the antenna.

Hereinafter, a method for storing and inputting a password using the above apparatus is described in more detail.

Figure 2:
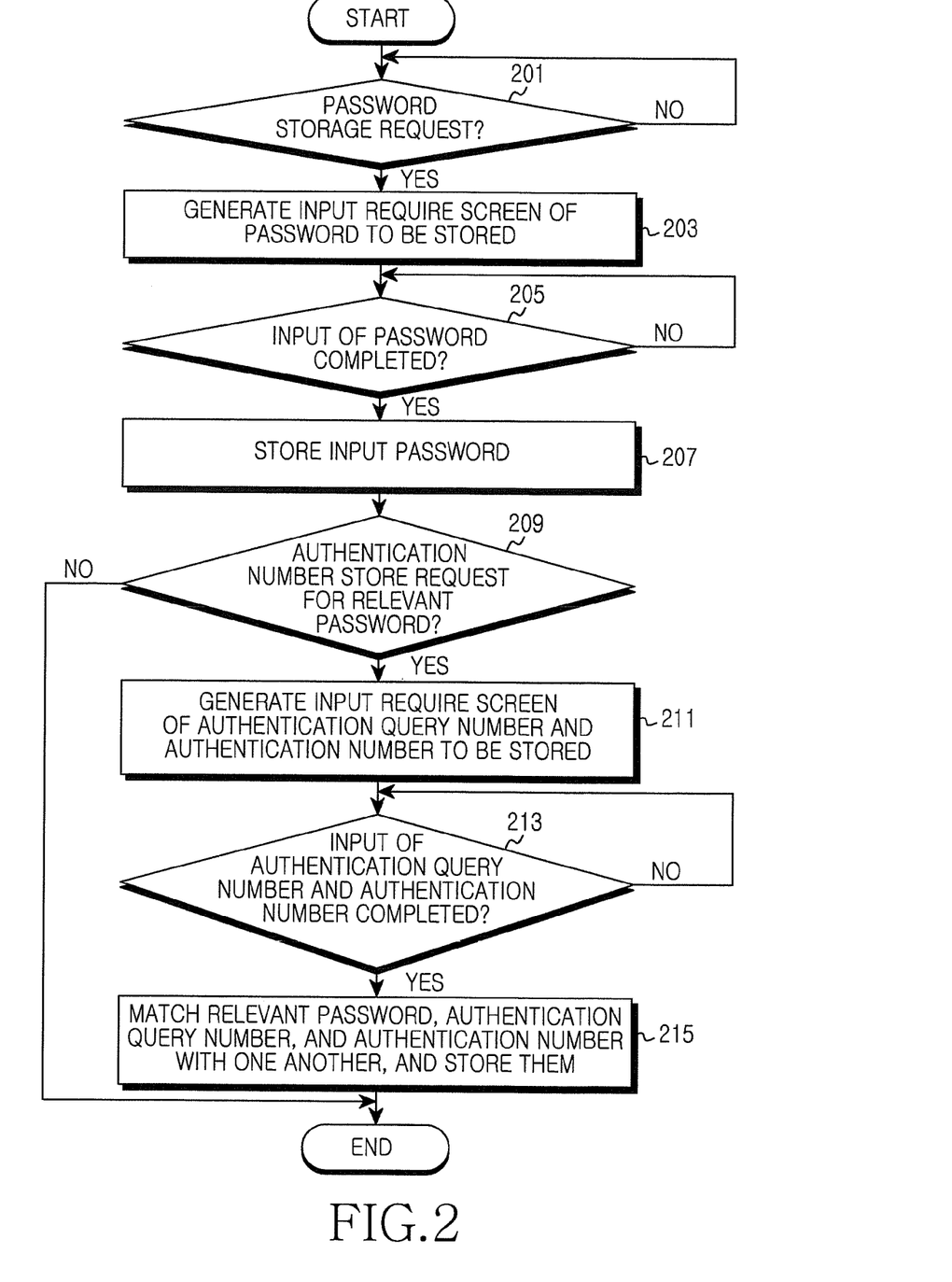
FIG. 2 illustrates a procedure for inputting a password and a corresponding authentication number according to an exemplary embodiment of the present disclosure.
Figure 4A:
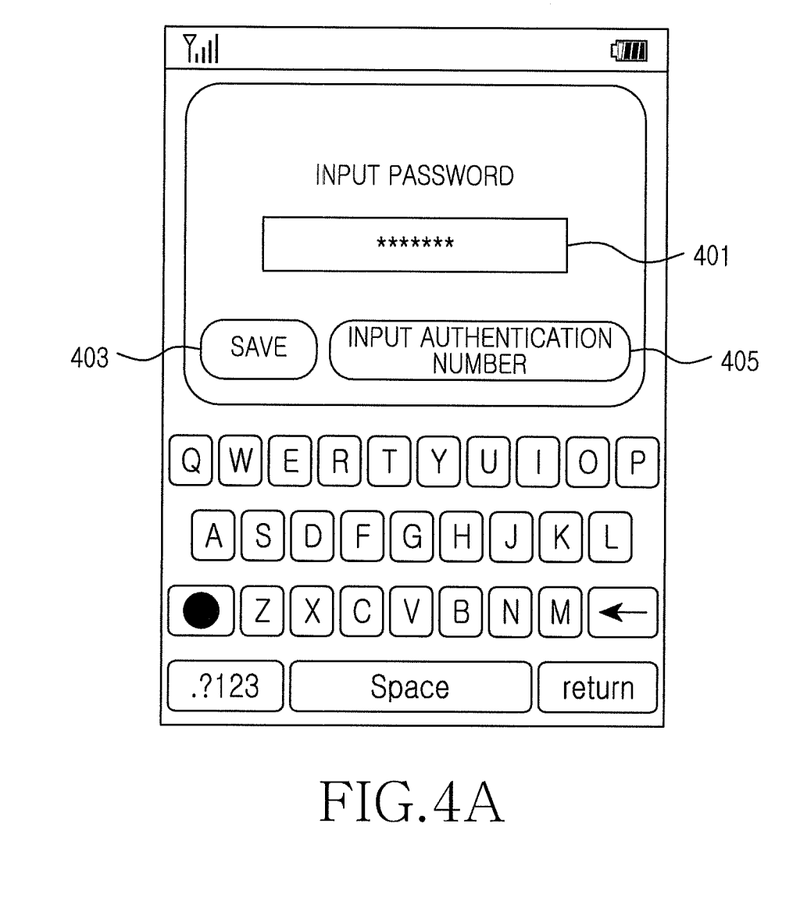
FIGS. 4A-B illustrate a screen displayed when an authentication number is input according to an exemplary embodiment of the present disclosure.
Figure 4B:
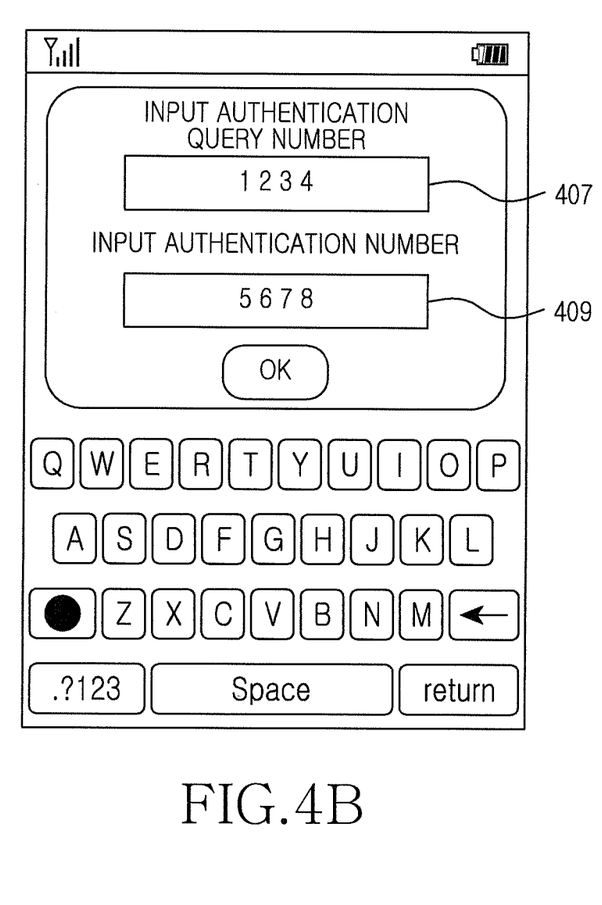

FIG. 2 illustrates a procedure for inputting a password and a corresponding authentication number according to an exemplary embodiment of the present disclosure, and FIGS. 4A-B illustrate a screen displayed when an authentication number is input according to an exemplary embodiment of the present disclosure.

As illustrated in FIGS. 2 and 4A-B, whether a user's request for storing a password exists is determined in step 201. A screen for this may be displayed right before the mobile terminal enters a relevant Internet site or enters various additional functions such as a phonebook. When a password input request is determined in step 201, the controller generates a screen for requiring input of a password to be stored on the display unit and provides the same to the user in step 203. This is a screen illustrated in FIG. 4A. A password input request window 401 is displayed, and a store button 403 and an authentication number input button 405 may be included in the lower portion.

When detecting that input of the password is completed in step 205, the controller stores the input password in the memory unit in step 207. This operation may occur when the user inputs the password and then inputs a store button as in the screen of FIG. 4A, or inputs an authentication number input button.

The controller determines whether an authentication number store request with respect to a relevant password exists in step 209. This operation is an operation of inputting the authentication number input button 405 in the screen of FIG. 4A. The controller displays, via the display unit, a screen for requiring input of an authentication query number and an authentication number to be stored in step 211. This operation is a screen corresponding to FIG. 4B, in which an authentication query number input window 407 and an authentication number input window 409 below the authentication query number input window are displayed. In this example, the authentication query number and the authentication number should be set to correspond to each other. For example, when the authentication query number is a four-digit number, the authentication number should be also a four-digit number. For the authentication query number and the authentication number, not only a four-digit number but also a various-digit number, characters, or a combination of numbers and characters may be used. However, authentication query number and the authentication number are not limited thereto. In the example where the authentication query number is a four-digit number, a three-digit authentication number may be input and allowed to correspond to a former three-digit number, a latter three-digit number, or a medium three-digit number of the authentication query number.

The controller determines whether input of the authentication query number and the authentication number is completed in step 213. When the input is completed, the controller matches the relevant password, the authentication query number, and the corresponding authentication number with one another together and stores them in the memory unit in step 215.

When the authentication number store request with respect to the relevant password does not exist in step 209, that is, when detecting input of the store button of FIGS. 4A-B, the controller stores only the password in the memory unit and ends the procedure.

Figure 3:
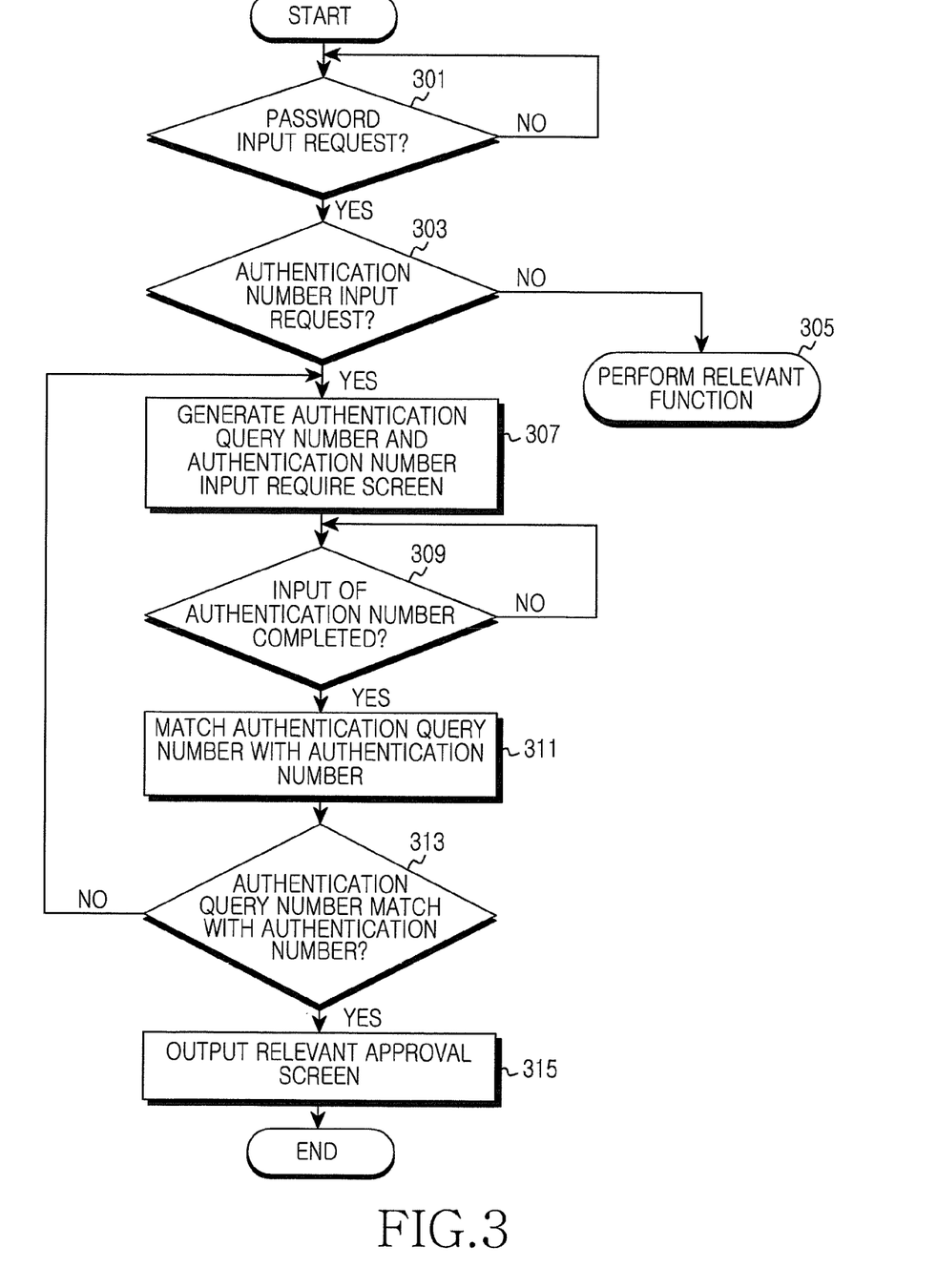
FIG. 3 illustrates a procedure for inputting an authentication number corresponding to an authentication query number according to an exemplary embodiment of the present disclosure.
Figure 5A:
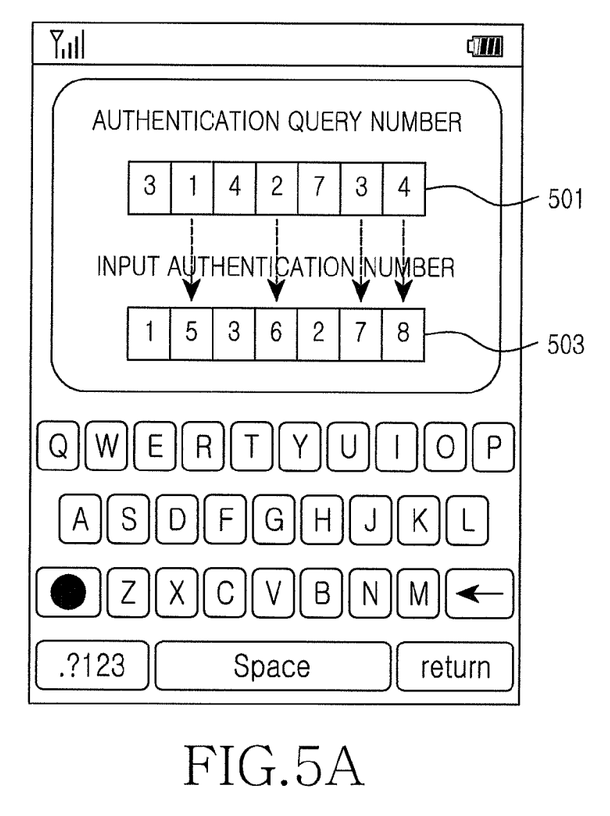
FIGS. 5A-B illustrate an authentication number input screen according to an exemplary embodiment of the present disclosure.
Figure 5B:
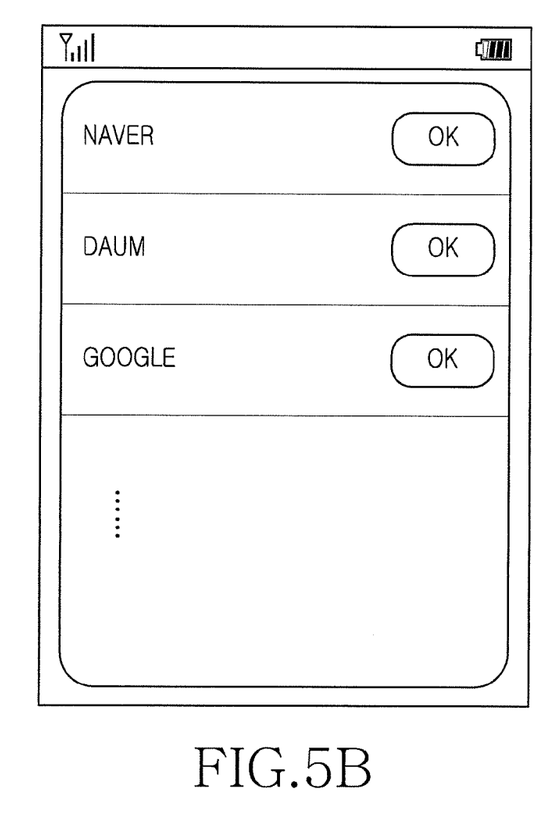

FIG. 3 illustrates a procedure for inputting an authentication number corresponding to an authentication query number according to an exemplary embodiment of the present disclosure, and FIGS. 5A-B illustrate an authentication number input screen according to an exemplary embodiment of the present disclosure.

As illustrated in FIGS. 3 and 5A-B, whether a password input request exists is determined in step 301. The password input request may be detected in an attempt for entering a relevant Internet site of a mobile terminal or entering various additional functions such as a phonebook.

Whether an authentication number input request exists in step 303. The authentication number input request may be set to automatically request an authentication number when a user initially inputs a password and an authentication number by setting. In addition, to prevent a password for entering a relevant approval screen from being exposed to other people, the user may directly request an authentication number input window on a relevant screen. For example, the user may enter an authentication number input screen by clicking an authentication number input button displayed on the mobile terminal or prepared separately.

When a password request exists but an authentication number input request does not exist in step 303, the controller may enter step 305 to perform a relevant function. The relevant function may be a function of directly inputting a password.

In contrast, when the authentication number input request exists in step 303, the controller proceeds to step 307 to control the password processor to generate an authentication query number and authentication number input request screen. This corresponds to a screen illustrated in FIG. 5A, and a plurality of numbers, characters, or a combination of numbers and characters is displayed on the authentication query number window 501 and the input authentication number window 503. The authentication query number and the input authentication number include a plurality of numbers, characters, or a combination of numbers and characters include a unique authentication query number or input authentication number stored by a user. For example, in FIG. 5A, authentication query number window 501 includes unique authentication query numbers 1, 2, 3, and 4, with the rest of numbers displayed at random.

The controller proceeds to step 309 to determine whether input of an authentication number is completed. This completion point automatically enters step 311 when the user inputs an authentication number completely to match an authentication query number with an authentication number.

At this point, the user inputs various numbers and characters besides an authentication number memorized by the user. That is, the user inputs a relevant authentication number to only a position corresponding to a relevant unique authentication query number, and inputs any number or character to the rest of portions at random. That is, as illustrated in FIG. 5A, 5 is input to an authentication number input blank corresponding to a unique authentication query number corresponding to 1 among a displayed authentication query number, 6 is input to an authentication number input blank corresponding to a unique authentication query number corresponding to 2 among the displayed authentication query number, 7 is input to an authentication number input blank corresponding to a unique authentication query number corresponding to 3 among the displayed authentication query number, and 8 is input to an authentication number input blank corresponding to a unique authentication query number corresponding to 4 among the displayed authentication query number, so that the authentication may be completed. Therefore, even when the user inputs an authentication number publicly, since the authentication number changes every time whenever the user inputs the authentication number, there is no danger of leakage of the authentication number. In addition, since a direct input of a password has been excluded, there is no exposure danger of a substantial password.

The controller determines that an authentication query number and an authentication number match with each other in step 313. When the authentication number matches with the authentication query number, the controller may enter a relevant approval screen in step 315. For example, the relevant approval screen displays various Internet portal sites as in FIG. 5B, and when the user clicks an Ok button of a relevant site, the user may enter a directly available screen.

Consequently, since a password input method according to an exemplary embodiment of the present disclosure uses a specific authentication number with respect to a specific authentication query number among a plurality of authentication query numbers with a general number in a combined manner, a password may be kept safe even when exposed and so use convenience is provided.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method to authenticate a user in an electronic device, the method comprising:
   detecting a request for an authentication function;
   in response to detecting the request for the authentication function, displaying a first string, wherein the first string comprises at least one user-defined number or character in a storage unit and at least one randomly selected number or character;
   receiving a second string including at least one user-input number or character via a touch screen;
   determining whether the at least one user-input number or character in the received second string is in a predefined one to one correspondence with the at least one user-defined number or character in the displayed first string; and
   determining a user authentication when the at least one user-input number or character in the received second string is in the predefined one to one correspondence with the at least one user-defined number or character in the displayed first string, wherein the user authentication is determined regardless of the others except at least one user-input number or character in the predefined one to one correspondence with the at least one user-defined number or character in the displayed first string.

2. The method of claim 1, wherein the first string comprises a random mix of the at least one user-defined character and the at least one randomly selected number or character.

3. The method of claim 1, further comprising prompting a user to input numbers or characters in boxes using the one to one correspondence with the numbers or characters of the displayed first string.

4. The method of claim 1, wherein the request of the authentication function occurs in response to a request to enter at least one predetermined content.

5. The method of claim 4, wherein the at least one predetermined content includes a given Internet site or a phone book.

6. The method of claim 1, further comprising:
   in response to determining that the at least one user-input number or character in the received second string is in the predefined one to one correspondence with the at least one user-defined number or character in the displayed first string, determining a user authentication.

7. The method of claim 6, wherein the user authentication is determined regardless of the others except at least one user-input number or character in the predefined one to one correspondence with the at least one user-defined number or character in the displayed first string.

8. An electronic device comprising:
   a touch screen;
   a storage unit configured to store at least one user-defined number or character; and
   a controller configured to:
   detect a request for an authentication function;
   in response to detecting the request for the authentication function, control the touch screen to display a first string on the touch screen, wherein the first string comprises the at least one user-defined number or character in the storage unit and at least one randomly selected number or character;
   receive a second string including at least one user-input number or character via the touch screen;
   determine whether the at least one user-input number or character in the received second string is in a predefined one to one correspondence with the at least one user-defined number or character in the displayed first string; and
   determine a user authentication when the at least one user-input number or character in the received second string is in the predefined one to one correspondence with the at least one user-defined number or character in the displayed first string, wherein the user authentication is determined regardless of the others except at least one user-input number or character in the predefined one to one correspondence with the at least one user-defined number or character in the displayed first string.

9. The device of claim 8, wherein the first string comprises a random mix of the at least one user-defined character and the at least one randomly selected number or character.

10. The of claim 8, wherein the controller is configured to prompt a user to input numbers or characters in boxes using the one to one correspondence with the numbers or characters of the displayed first string.

11. The device of claim 8, wherein the electronic device comprises a mobile communication terminal.

12. The device of claim 8, wherein the request for the authentication function occurs in response to a request to enter at least one predetermined content.

13. The device of claim 12, wherein the at least one predetermined content includes a given Internet site or a phone book.

14. An electronic device comprising:
   a detection unit configured to detect a request for an authentication function;
   a display unit configured to display a first string comprising at least one user-defined number or character in a storage unit and at least one randomly selected number or character in response to detecting the request for the authentication function;
   a receiver configured to receive a second string including at least one user-input number or character via a touch screen; and
   a control unit configured to:
   determine whether the at least one user-input number or character in the received second string is in a predefined one to one correspondence with the at least one user-defined number or character in the displayed first string, and
   determine a user authentication in response to determining that the at least one user-input number or character in the received second string is in the predefined one to one correspondence with the at least one user-defined number or character in the displayed first string, wherein the user authentication is determined regardless of the others except at least one user-input number or character in the predefined one to one correspondence with the at least one user-defined number or character in the displayed first string.

15. The device of claim 14, wherein the first string comprises a random mix of the at least one user-defined character and the at least one randomly selected number or character.

16. The device of claim 14, wherein the control unit is further configured to prompt a user to input numbers or characters in boxes using the one to one correspondence with numbers or characters of the displayed first string.

* * * * *